(12) United States Patent
Moyer et al.

(10) Patent No.: US 11,797,352 B2
(45) Date of Patent: Oct. 24, 2023

(54) SAAS INFRASTRUCTURE FOR FLEXIBLE MULTI-TENANCY

(71) Applicant: VMware, Inc., Palo Alto, CA (US)

(72) Inventors: Matt Moyer, Kansas City, MO (US); Chirag Divyakant Kapadia, Bothell, WA (US); Prakash Arumugam, Bellevue, WA (US); Fabio Yeon, Mill Creek, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/510,178

(22) Filed: Oct. 25, 2021

(65) Prior Publication Data
US 2022/0043692 A1 Feb. 10, 2022

Related U.S. Application Data

(63) Continuation of application No. 16/848,725, filed on Apr. 14, 2020, now Pat. No. 11,182,219.

(51) Int. Cl.
| | |
|---|---|
| *G06F 15/16* | (2006.01) |
| *G06F 9/54* | (2006.01) |
| *H04L 29/06* | (2006.01) |
| *G06F 9/50* | (2006.01) |
| *H04L 69/08* | (2022.01) |
| *G06F 8/70* | (2018.01) |
| *H04L 61/4511* | (2022.01) |

(52) U.S. Cl.
CPC .............. *G06F 9/5072* (2013.01); *G06F 8/70* (2013.01); *G06F 9/5077* (2013.01); *H04L 61/4511* (2022.05); *H04L 69/08* (2013.01)

(58) Field of Classification Search
CPC ........ G06F 8/70; G06F 9/5072; G06F 9/5077; G06F 9/45558; H04L 69/08; H04L 61/4511; H04L 41/08
USPC ........................................................ 709/203
See application file for complete search history.

(56) References Cited

U.S. PATENT DOCUMENTS

| | | | |
|---|---|---|---|
| 9,639,338 B2 * | 5/2017 | Ruehl | .................. H04L 67/1095 |
| 10,361,917 B1 | 7/2019 | Parthasarathy et al. | |
| 10,467,241 B2 * | 11/2019 | Thayer | ................ H04L 41/0806 |
| 10,469,318 B1 | 11/2019 | Parthasarathy et al. | |
| 10,965,752 B1 | 3/2021 | Smith | |
| 11,080,041 B1 * | 8/2021 | Ah Kun | .............. G06F 9/44505 |

(Continued)

OTHER PUBLICATIONS

E. Yang, Y. Zhang, L. Wu, Y. Liu and S. Liu, "A Hybrid Approach to Placement of Tenants for Service-Based Multi-tenant SaaS Application," 2011 IEEE Asia-Pacific Services Computing Conference, Jeju, Korea (South), 2011, pp. 124-130, doi: 10.1109/APSCC.2011. 35. (Year: 2011).*

(Continued)

*Primary Examiner* — Hamza N Algibhah

(57) ABSTRACT

Techniques for implementing a software-as-a-service (SaaS) infrastructure that supports flexible multi-tenancy are provided. In various embodiments, this SaaS infrastructure employs a hybrid design that can flexibly accommodate both single-tenant and multi-tenant instances of a SaaS application. Accordingly, with this infrastructure, a SaaS provider can advantageously support high levels of isolation between certain tenants of its application (as dictated by the tenants' needs and/or other criteria) while keeping the marginal cost of operating the infrastructure as low as possible.

18 Claims, 5 Drawing Sheets

(56) References Cited

U.S. PATENT DOCUMENTS

| | | | |
|---|---|---|---|
| 2005/0091346 A1 | 4/2005 | Krishnaswami et al. | |
| 2008/0301175 A1 | 12/2008 | Applebaum et al. | |
| 2010/0023937 A1* | 1/2010 | Kothari | G06Q 10/06 717/170 |
| 2010/0049637 A1* | 2/2010 | Laventman | G06Q 20/145 705/400 |
| 2010/0114618 A1* | 5/2010 | Wilcock | G06Q 10/06375 705/348 |
| 2010/0115490 A1* | 5/2010 | Wilcock | G06F 8/10 717/104 |
| 2010/0250608 A1* | 9/2010 | Malviya | G06F 16/217 707/E17.055 |
| 2011/0213870 A1* | 9/2011 | Cai | H04L 67/10 709/223 |
| 2013/0282994 A1 | 10/2013 | Wires et al. | |
| 2014/0101178 A1* | 4/2014 | Ginter | G06F 16/334 707/755 |
| 2015/0058484 A1* | 2/2015 | Mehta | G06F 9/5072 709/225 |
| 2015/0215376 A1* | 7/2015 | Kranz | H04N 21/4431 709/226 |
| 2015/0278311 A1 | 10/2015 | Isherwood, Jr. et al. | |
| 2015/0309780 A1* | 10/2015 | Ruehl | H04L 67/1095 717/176 |
| 2018/0046951 A1* | 2/2018 | Mohindra | G06Q 10/067 |
| 2018/0097694 A1* | 4/2018 | Raz | H04L 67/10 |
| 2018/0107679 A1 | 4/2018 | Arneja et al. | |
| 2018/0198868 A1* | 7/2018 | Klaghofer | H04L 65/1104 |
| 2018/0278675 A1* | 9/2018 | Thayer | H04L 41/0806 |
| 2018/0314746 A1* | 11/2018 | Gujarathi | G06F 16/9566 |
| 2018/0367363 A1* | 12/2018 | Jaeger | H04L 41/022 |
| 2019/0222988 A1* | 7/2019 | Maes | G06F 8/61 |
| 2019/0235775 A1 | 8/2019 | Zwiegincew et al. | |
| 2019/0384835 A1 | 12/2019 | Luo et al. | |
| 2020/0019622 A1 | 1/2020 | Lu et al. | |
| 2020/0076685 A1 | 3/2020 | Vaidya et al. | |
| 2020/0193043 A1* | 6/2020 | Hoehmann | G06F 16/95 |
| 2020/0304599 A1 | 9/2020 | Kanso et al. | |
| 2020/0348918 A1 | 11/2020 | Giannetti | |
| 2020/0379816 A1* | 12/2020 | Lin | G06F 9/5072 |
| 2021/0042314 A1 | 2/2021 | Batlle | |
| 2021/0075693 A1 | 3/2021 | Su et al. | |
| 2021/0185125 A1 | 6/2021 | Smith | |
| 2021/0200814 A1 | 7/2021 | Tal et al. | |
| 2021/0264520 A1* | 8/2021 | Cummings | G06Q 40/12 |
| 2021/0312392 A1 | 10/2021 | Zhou et al. | |
| 2021/0318913 A1 | 10/2021 | Moyer et al. | |
| 2021/0318914 A1 | 10/2021 | Moyer et al. | |
| 2022/0058285 A1 | 2/2022 | Trenholm et al. | |

OTHER PUBLICATIONS

C. Fehling, F. Leymann, D. Schumm, R. Konrad, R. Mietzner and M. Pauly, "Flexible Process-Based Applications in Hybrid Clouds," 2011 IEEE 4th International Conference on Cloud Computing, Washington, DC, USA, 2011, pp. 81-88, doi: 10.1109/CLOUD.2011.37. (Year: 2011).*

T. Kwok, T. Nguyen and L. Lam, "A Software as a Service with Multi-tenancy Support for an Electronic Contract Management Application," 2008 IEEE International Conference on Services Computing, Honolulu, HI, USA, 2008, pp. 179-186, doi: 10.1109/SCC.2008.138. (Year: 2008).*

Mixed-Tenancy Systems—A hybrid Approach between Single and Multi-Tenancy Aug. 2014 Edition: 1Publisher: Dr. HutISBN: 9783843916646 Authors: Stefan T. Ruehl (Year: 2014).*

"Ingress", https://kubernetes.io/docs/concepts/servicesnetworking/ingress; Mar. 31, 2020.

"Extending you Kubernetes Cluster", URL https://kubernetes.io/docs/concepts/extend-kubernetes/api-extension/custom-resources; Nov. 20, 2018.

"Amazon RDS Multi-AZ deployments"; https://aws.amazon.com/rds/details/multi-az; downloaded May 4, 2020.

Bobby Tables, "Dynamic Kubernetes Informers", https://www.firehydrant.io/blog/dynamic-kubernetes-informers/; Aug. 28, 2019.

"Pod Overview", https://kubernetes.io/docs/concepts/workloads/pods/podoverview/; Apr. 21, 2020.

Colm MacCárthaigh, "Workload isolation using shuffle-sharding", 2019. https://aws.amazon.com/builders-library/workload-isolation-using-shuffle-sharding/; downloaded May 4, 2020.

Reuven Krebs, Chrislof Momm, and Samuel Kounev. Architectural concerns in multi-tenant saas applications. Closer, 12:426-431, Apr. 2012.

URL https://cloud.vmware.com/lanzu-mission-control; downloaded May 4, 2020.

Amazon elastic compute cloud {amazon ec2), 2020. URL https://aws.amazon.com/ec2/; downloaded May 5, 2020.

Kuberneles, 2020. URL https://kuberneles.io/; downloaded May 1, 2020.

Envoy proxy, 2020. URL https://www.envoyproxy.io; downloaded May 1, 2020.

James C Corbell, Jeffrey Dean, Michael Epstein, Andrew Fikes, Christopher Frost, Jeffrey John Furman, Sanjay Bhemawal, Andrey Gubarev, Christopher Heiser, Peter Hochschild, et al. Spanner: Google's globally distributed : Database. ACM Transactions on Computer Systems, vol. 31, No. 3, Article 8, Publication dale: Aug. 2013.

Giuseppe Decandia et al., "Dynamo: amazon's highly available key-value store", ACM SIGOPS operating systems eview, 41 (6):205-220, Oct. 2004.

Craig D Weissman et al., "The Design of the Force.com Multitenant Internet Application Development Platform", In Proceedings of the 2009 ACM SIGMOD International Conference on Management of data, pp. 889-896, Jun. 29, 2009.

How we took our server side application to the cloud and liked what we got, hllps://www.slideshare.net/DevopsCon/how-we-look-our-server-sideapplicalion-lo-lhe-cloud-and-liked-what-we-got-16237021; Jan. 29, 2013.

Mike Arpaia, Using a Kubernetes Operator to Manage Tenancy in a B2B Saa app; https://blog.kolide.com/using-a-kubernetes-operator-to-managetenancy-in-a-b2b-saas-app-250f1 c9416ce, May 15, 2018.

Howard Yoo, Wavefront Architecture, https://confluence.eng.vmware.com/display/PS/Wavefronl+Architecture; Oct. 29, 2019.

Sanjeev Rampal et al., https://github.com/kubernetes/community/tree/master/wgmultitenancy; downloaded May 4, 2020.

Consistent Infrastructure Consistent Operations, https://cloud.vmware.com; downloaded May 4, 2020.

Related to Granted U.S. Appl. No. 16/848,725; Non-Final Office Action dated Apr. 14, 2020; copy available in IFW.

Related to Granted U.S. Appl. No. 16/848,725; Notice of Allowance dated Jul. 26, 2021; copy available in IFW.

Related to pending U.S. Appl. No. 16/837,669; Non-Final Office Action dated Oct. 12, 2021; copy available in IFW.

Related to pending U.S. Appl. No. 16/837,669; Final Office Action dated May 10, 2022; copy available in IFW.

Related to pending U.S. Appl. No. 16/848,757; Non-Final Office Action dated Jun. 14, 2022; copy available in IFW.

Related to pending U.S. Appl. No. 16/837,669; Non-Final Office Action dated Nov. 3, 2022; copy available in IFW.

* cited by examiner

SAAS INFRASTRUCTURE FOR FLEXIBLE MULTI-TENANCY

CROSS-REFERENCES TO RELATED APPLICATIONS

The present application is a continuation of U.S. patent application Ser. No. 16/848,725 filed Apr. 14, 2020, now U.S. Pat. No. 11,182,219 issued Nov. 23, 2021, and entitled "SaaS Infrastructure for Flexible Multi-Tenancy," the entire contents of which are incorporated herein by reference for all purposes.

BACKGROUND

SaaS, or "software-as-a-service," is a software delivery model in which a third-party provider hosts applications on a cloud infrastructure (referred to herein as a "SaaS infrastructure") and makes the applications available to customers via the Internet. SaaS has become a common mechanism for delivering enterprise applications to organizations because it eliminates the need for those organizations to install and maintain the applications in their own data centers, resulting in lower upfront costs and greater operational agility.

In a SaaS application, a tenant is a group of users that can see and interact with the same data through the application. Each tenant typically corresponds to a single customer of the SaaS application, such as a single organization. The tenancy model of a SaaS application defines how the data and computation of the application's various tenants are isolated from each other. Traditional SaaS infrastructures are designed to host SaaS applications that implement either a pure "single-tenant" model in which an application's tenants each interact with a separate runtime instance of the application, or a pure "multi-tenant" model in which an application's tenants all share the same application instance. In the former case, the tenants are effectively isolated from each other at an infrastructure platform (e.g., container/virtual machine/physical machine) level. In the latter case, the application itself must implement code to prevent one tenant's data and operations from being visible by another.

The chosen tenancy model of a SaaS application has a wide-reaching impact on the application's security, cost of operation, performance, and scalability. For example, the multi-tenant model allows for improved resource efficiency and reduced operating costs over the single-tenant model. However, multi-tenancy also increases the risk of cross-tenant data leakage, the likelihood of degraded application performance, and the complexity of scaling the application to handle ever larger numbers of customers.

DETAILED DESCRIPTION

Figure 1:
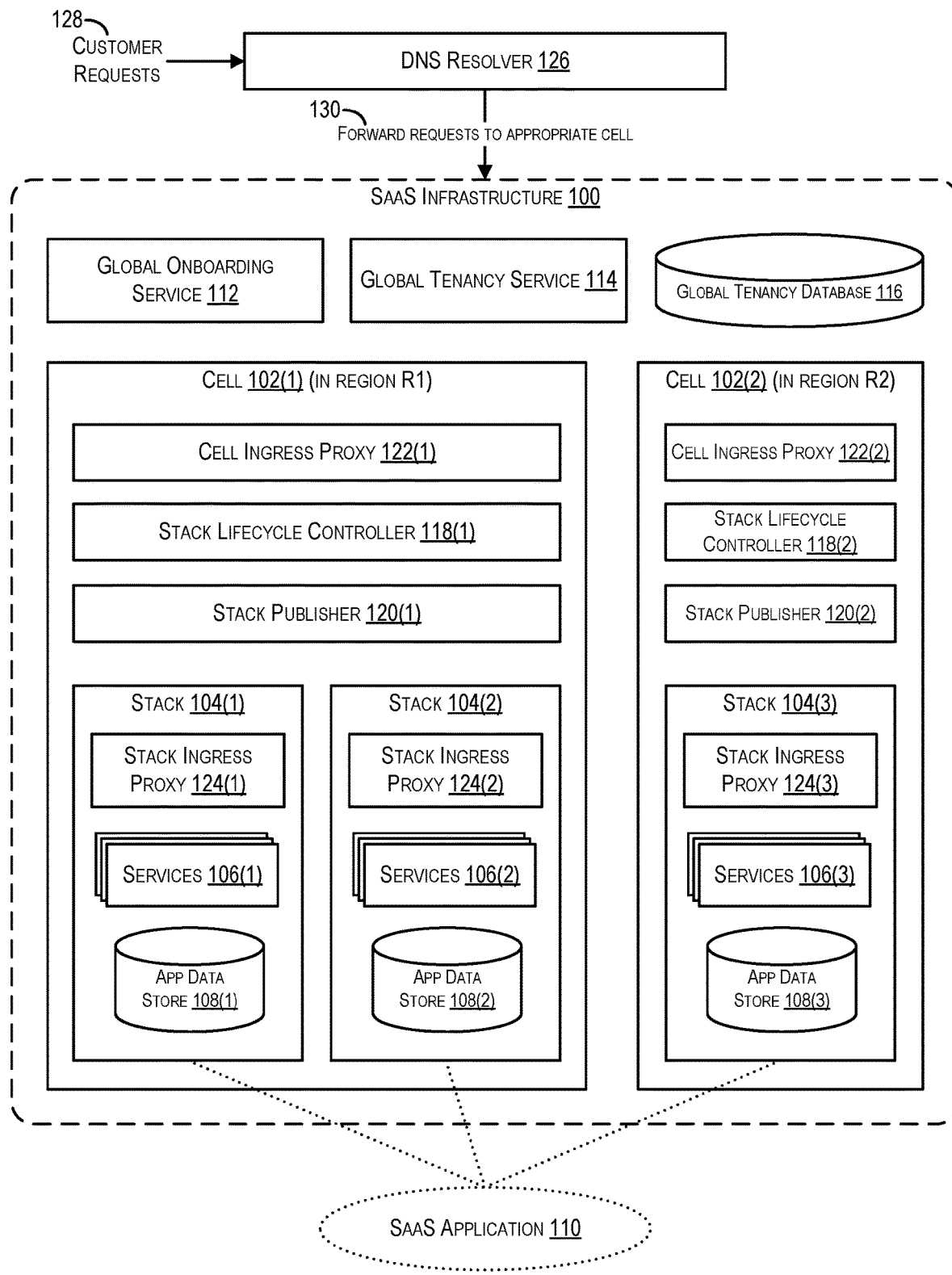
FIG. 1 depicts the design of a SaaS infrastructure in accordance with certain embodiments.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to a novel SaaS infrastructure that supports "flexible multi-tenancy"—in other words, a tenancy model in which some tenants of a SaaS application may share the same application instance (as in the multi-tenant model) while other tenants of the application may be assigned to their own, separate application instances (as in the single-tenant model).

As noted previously, traditional SaaS infrastructures are focused on supporting the extreme cases of a purely single-tenant application or a purely multi-tenant application. However, pure single tenancy and pure multi-tenancy exhibit different tradeoffs that can make neither approach an ideal solution for certain use cases/applications. For example, consider a scenario in which the provider of a SaaS application A wishes to (1) offer a free trial version of A to new customers that may be interested in trying out the application before committing to a subscription, as well as (2) offer A to "data sensitive" customers with stringent data governance and/or compliance requirements (e.g., financial institutions, telecommunications companies, etc.). In this scenario, pure single-tenancy would work best for (2) because it allows for a significantly greater degree of isolation between tenants than pure multi-tenancy. On the other hand, pure multi-tenancy would work best for (1) because it can scale to support a large number of trial customers with low marginal operating cost, which is not possible with pure single tenancy.

To address the foregoing and other similar scenarios, the SaaS infrastructure of the present disclosure employs a hybrid design that can flexibly accommodate both single-tenant and multi-tenant instances of a SaaS application. For instance, by applying this infrastructure to application A above, the trial customers of A can be collectively assigned to a single instance of A (thereby minimizing the marginal cost of hosting these trial customers), and at the same time the data sensitive customers of A can be individually assigned to separate instances of A (thereby more strongly isolating these customers from other tenants). In some embodiments, the separate instances of A assigned to the data sensitive customers may also be placed on entirely separate backend clusters. Thus, with the SaaS infrastructure of the present disclosure, a SaaS provider can advantageously support high levels of isolation between certain tenants of its application (as dictated by the tenants' needs and/or other criteria) while keeping the marginal cost of operating the infrastructure as low as possible.

2. Infrastructure Design

FIG. 1 is a simplified block diagram depicting the design of a SaaS infrastructure 100 that supports flexible multi-tenancy in accordance with certain embodiments. SaaS infrastructure 100 is composed of two types of building blocks: cells and stacks. In FIG. 1, SaaS infrastructure 100 is shown as including two cells (102(1) and 102(2)) and three stacks (104(1), 104(2), and 104(3)) for purposes of illustration. However, SaaS infrastructure 100 may be scaled to include any number of these entities, subject to the constraints that a stack should be part of a cell and a cell should include at least one stack.

Each cell 102 of SaaS infrastructure 100 is a cluster of computing resources (e.g., physical or virtual machines) that provides the backend infrastructure on which one or more stacks may be placed and run. For example, in the case where each stack 104 is implemented as a collection of executable containers, each cell 102 may correspond to a Kubernetes cluster (i.e., a cluster that employs the Kubernetes container orchestration platform). In FIG. 1, cells 104(1) and 104(2) are located in different geographic regions R1 and R2 respectively, thereby providing global (or at least multi-regional) availability for SaaS infrastructure 100.

Each stack 104 of SaaS infrastructure 100 includes, among other things, a set of software services 106 and an application data store 108 that provide the core functionality of a SaaS application 110 hosted by SaaS infrastructure 100. Thus, each stack 104 can be understood as representing an independent runtime instance of SaaS application 110. Significantly, each stack 104 can be mapped to one or multiple customers of SaaS application 110 (where a "mapping" between a customer C and a stack S indicates that stack S holds all of the application data of, and is responsible for serving all application traffic to, customer C). This enables SaaS infrastructure 100 to support flexible multi-tenancy as mentioned earlier, because the many-to-one mappings of customers to stacks within the infrastructure means that each stack 104 can operate as either a single-tenant or multi-tenant instance of SaaS application 110.

Figure 2:
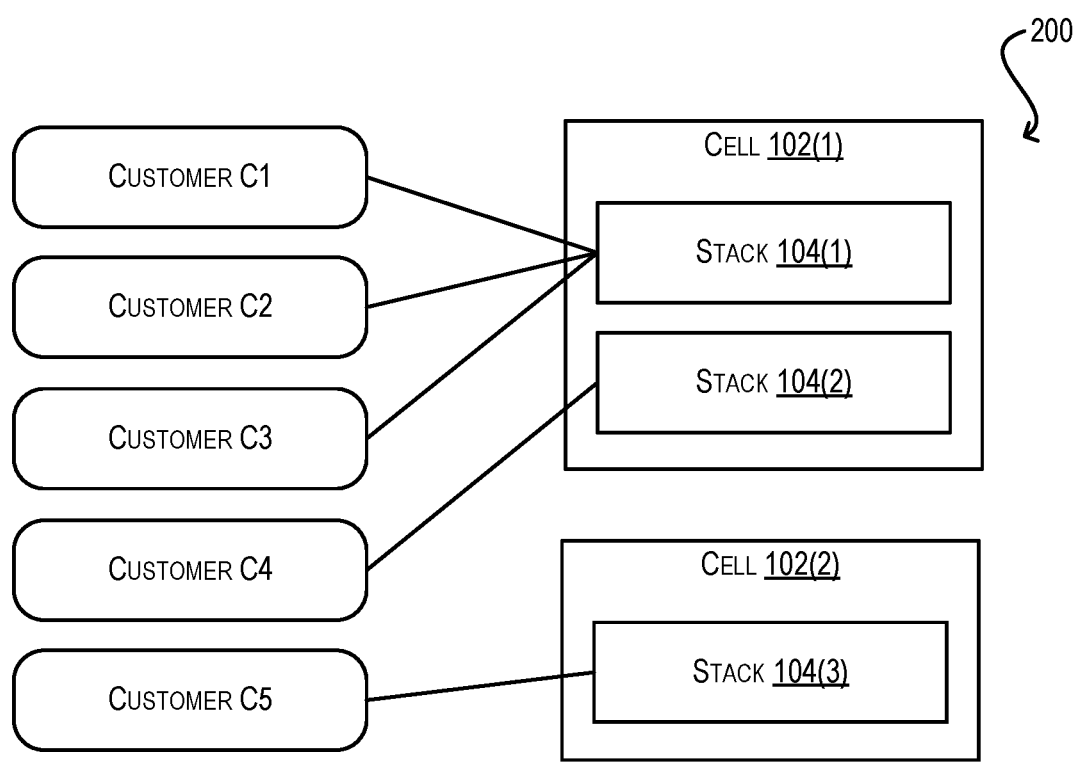
FIG. 2 depicts an example mapping of customers to stacks within the SaaS infrastructure of FIG. 1 according to certain embodiments.

To illustrate this, FIG. 2 depicts an example scenario 200 in which five customers C1, C2, C3, C4, and C5 are mapped to stacks 104(1), 104(2), and 104(3) of SaaS infrastructure 100. In this scenario, three of the customers (i.e., C1-C3) are mapped to stack 104(1), rendering stack 104(1) a multi-tenant instance of SaaS application 110. In contrast, a single customer (i.e., C4) is mapped to stack 104(2) and another single customer (i.e., C5) is mapped to stack 104(3), rendering each of these stacks a single-tenant instance of SaaS application 110. Note that for stack 104(3), its single tenant C5 is not only isolated from the other customers at the stack level; C5 is also isolated from customers C1-C4 at the cell (i.e., regional/network) level because stack 104(3) is deployed on its own cell 102(2). This advantageously provides a further degree of isolation for customer C5, which may be an organization that is subject to particularly strict data protection/governance requirements.

To facilitate the correct handling of mixed single-tenant and multi-tenant stacks as illustrated in FIG. 2, SaaS infrastructure 100 of FIG. 1 includes a number of additional components that enable the infrastructure to achieve two objectives: (1) manage which customers are mapped to (i.e., hosted on) each stack, and (2) route customer requests (e.g., HyperText Transfer Protocol (HTTP) requests for accessing SaaS application 110) to the appropriate stack.

With respect to objective (1) (stack tenancy management), SaaS infrastructure 100 includes a global onboarding service 112, a global tenancy service 114, and a global tenancy database 116 (these components are referred to as "global" components because they operate outside of the bounds of a single cell or stack). At a high level, when a new customer has subscribed to SaaS application 110, global onboarding service 112 can identify a stack to which the new customer should be mapped and can communicate this information to global tenancy service 114. In response, global tenancy service 114 can store a mapping between the new customer and the identified stack in global tenancy database 116, thereby enabling SaaS infrastructure 100 to track this association. Conversely, when an existing customer has canceled its subscription to SaaS application 110, global onboarding service 112 (or some other component of the infrastructure) can send an indication of the cancellation to global tenancy service 114 and service 114 can delete the existing customer-to-stack mapping maintained for that customer in global tenancy database 116.

In some cases, the onboarding of a new customer may require the deployment of a brand new stack within SaaS infrastructure 100. In these cases, global onboarding service 112 can identify an appropriate cell 102 in which the new stack should be created and can provide information regarding the new stack to a stack lifecycle controller 118 within the identified cell. In response, stack lifecycle controller 118 can automatically deploy the new stack and, upon completion of this operation, a cell-level stack publisher 120 can return metadata details regarding the stack (e.g., stack identifier (ID), network endpoint address, etc.) to global tenancy service 114 for storage in global tenancy database 116. Global onboarding service 112 can then retrieve these details from global tenancy database 116 via service 114 and proceed with mapping the new customer to the new stack.

With respect to objective (2) above (customer request routing), SaaS infrastructure 100 includes a cell ingress proxy 122 within each cell 102 and a stack ingress proxy 124 within each stack 104. Generally speaking, when a customer of SaaS application 110 logs in and submits a request to access some functionality of the application, the request can be forwarded, via a DNS resolver 126 fronting SaaS infrastructure 100, to the cell ingress proxy of the cell that hosts the customer's stack (shown via reference numerals 128 and 130). In certain embodiments, this forwarding process can be based upon a set of DNS routing records maintained by DNS resolver 126 that map unique domain names assigned to the customers of SaaS application 110 to the network endpoint addresses of the customers' cells (described in further detail below).

Upon receiving the customer request from DNS resolver 126, cell ingress proxy 122 can determine (based on, e.g., the customer domain mentioned above and a customer-to-domain mapping maintained in global tenancy database 116) the specific stack to which the customer belongs. Cell ingress proxy 122 can then send the customer request to that stack and the stack's corresponding stack ingress proxy 124 can forward the request to the appropriate service 106 of SaaS application 110 for processing.

The following sections provide additional details regarding the customer onboarding, stack deployment, and customer traffic routing mechanisms noted above. It should be appreciated that SaaS infrastructure 100 of FIG. 1 is illustrative and various modifications are possible. For example, although global components 112, 114, and 116 are shown as residing outside of cells 102(1) and 102(2), in certain embodiments a replicated instance of components 112-116 may be deployed on a per cell basis within SaaS infrastructure 100 for use by the local components of each cell. In these embodiments, the contents of global tenancy database 116 may be synchronized across the per-cell instances of the database so that each instance maintains the same set of tenancy data.

Further, although each stack 104 is depicted as maintaining its own application data store 108, in some embodiments multiple stacks within a cell may be configured to share the same application data store. This approach reduces the cost of operating those stacks, at the expense of eliminating storage-level isolation between the stacks' tenants. The decision of whether a particular stack 104 should maintain its own application data store 108 or share an application data store with one or more other stacks can be made at the time of deploying that stack on the infrastructure.

3. Customer Onboarding

Figure 3:
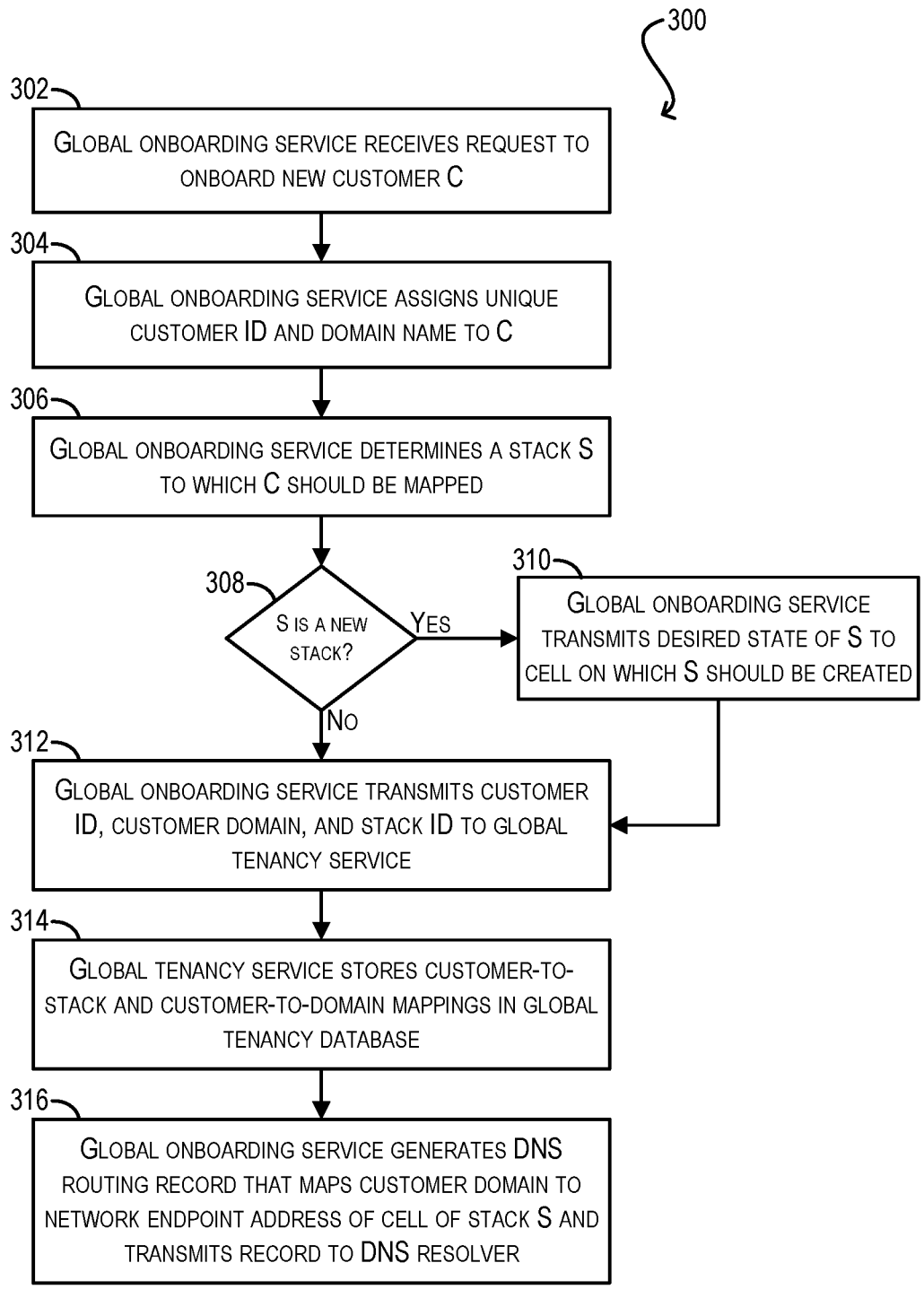
FIG. 3 depicts a customer onboarding workflow according to certain embodiments.

FIG. 3 depicts a workflow 300 that may be performed by global onboarding service 112 (in conjunction with global tenancy service 114) for onboarding a new customer for SaaS application 110 and placing the new customer onto a stack 104 of SaaS infrastructure 100 according to certain embodiments.

Starting with block 302, global onboarding service 112 can receive a request to onboard a new customer C, where the request optionally includes one or more customer preferences or requirements regarding the placement of C on SaaS infrastructure 100. For example, the request may indicate that customer C prefers to be hosted on an application instance within a particular geographic region where the majority of the customer's users reside, or that the data of customer C must be isolated from other tenants at a regional/network level for legal reasons. In one set of embodiments, the onboarding request may received from a self-service user interface (UI) operated by a user of customer C. In other embodiments, the onboarding request may be received from an administrator/operator of SaaS application 110.

At block 304, global onboarding service 112 can assign a unique customer ID and a unique domain name (e.g., "customerC.appname.com") to customer C. This unique domain name is the domain to which all application requests originating from the users of customer C will be directed for routing purposes. Global onboarding service 112 can further determine a particular stack S of SaaS infrastructure 110 on which customer C will be hosted based on the current configuration of the infrastructure (block 306). If the onboarding request included one or more customer preferences or requirements regarding this placement, global onboarding service 112 can take these factors into account as part of carrying out the determination at block 306. If the onboarding request did not include any customer preferences/requirements, global onboarding service 112 can determine stack S based on other criteria, such as the number of customers/tenants currently hosted on each cell and stack of SaaS infrastructure 100.

Figure 4:
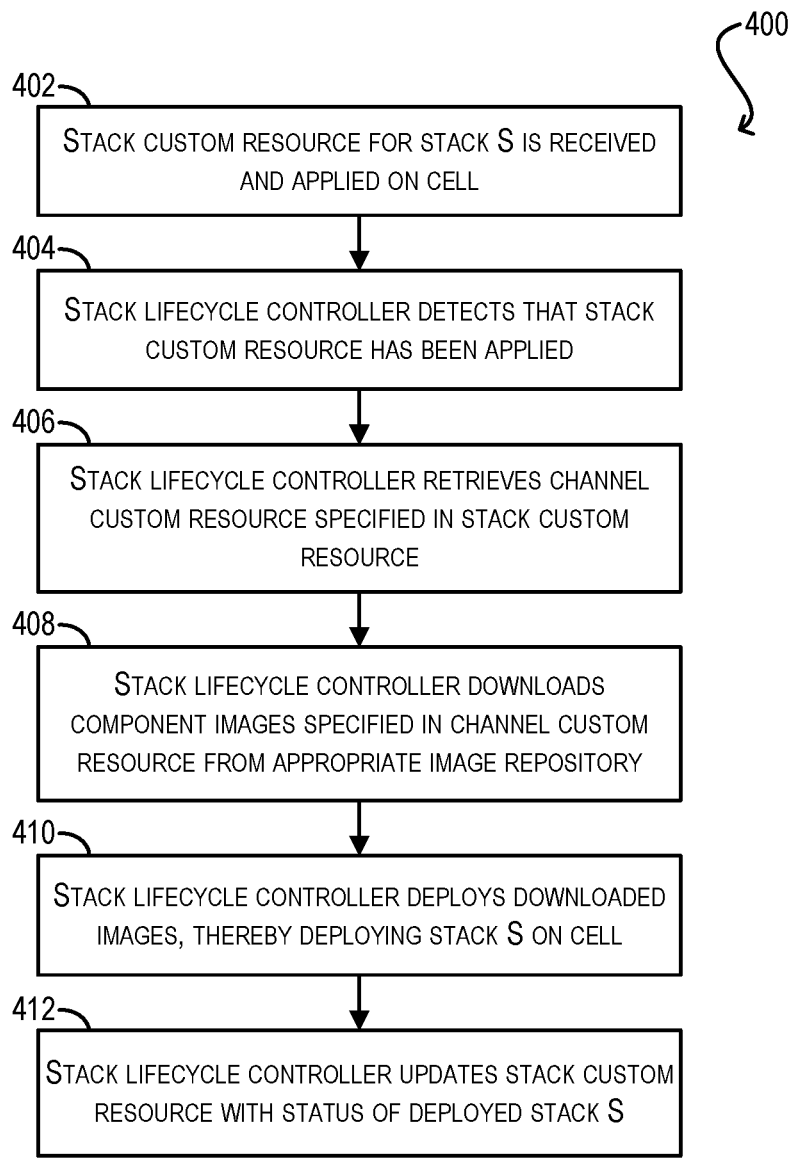
FIG. 4 depicts a Kubernetes-based stack deployment workflow according to certain embodiments.

In some cases, global onboarding service 112 may determine that stack S for customer C should be a brand new stack (block 308). For example, global onboarding service 112 may find that all of the existing stacks of SaaS infrastructure 100 have reached a capacity threshold and thus customer C cannot be placed on an existing stack. In these cases, global onboarding service 112 can transmit information regarding the desired configuration/state of stack S to the cell on which the stack should be created (block 310). This, in turn, will cause the receiving cell's stack lifecycle controller 118 to deploy stack S in accordance with the desired configuration/state. FIG. 4 below presents a particular method for executing this stack deployment in the scenario where the cells of SaaS infrastructure 100 are Kubernetes clusters and stack lifecycle controller 118 is a Kubernetes controller.

Once stack S has been determined (and created if needed), global onboarding service 112 can transmit customer C's ID and unique domain name, as well as the ID of stack S, to global tenancy service 114 (block 312). In response, global tenancy service 114 can store (1) a mapping between the ID of customer C and its domain name, and (2) a mapping between the ID of customer C and the ID of stack S, in global tenancy database 116 (block 314).

Finally, at block 316, global onboarding service 112 can generate a DNS routing record that maps the domain name for customer C to the network endpoint address of the cell in which stack S resides and transmit the generated routing record to DNS resolver 126. As described in section (5) below, DNS resolver 126 can use this DNS routing record to directly route incoming application requests from the users of customers C to the cell of stack S so that it can be ultimately delivered, via cell ingress proxy 122 and stack ingress proxy 124, to the appropriate service 106 within stack S.

4. Kubernetes-Based Stack Deployment

FIG. 4 depicts a workflow 400 that may be performed by stack lifecycle controller 118 of a given cell of SaaS infrastructure 100 for deploying a new stack S on that cell (in accordance with, e.g., block 310 of FIG. 3) using Kubernetes constructs. Workflow 400 assumes that stack S comprises a collection of containers (e.g., Docker containers) and stack lifecycle controller 118 is a Kubernetes controller. Workflow 400 further assumes that stack lifecycle controller 118 is configured to recognize and process two types of Kubernetes custom resource definitions (CRDs): a channel custom resource and a stack custom resource. As used herein, a "channel custom resource" is a Kubernetes CRD that defines the configuration of a stack type and includes (1) an image registry path for component images of the stack type, where a "component image" comprises a bundle of configuration files that are self-sufficient to deploy a corresponding component (i.e., service 106) of the stack type, (2) component image versions, and (3) the paths via which the components can be reached. A "stack custom resource" is a Kubernetes CRD that defines the desired state of a particular stack and includes (1) a reference to a channel custom resource (which indicates that the stack is an instance of the stack type defined by that channel), and (2) various metadata/configuration values that may be specific to the stack (e.g., stack name, etc.).

By way of example, Listing 1 below presents a channel custom resource named "unstable" with one component/service "UI" and Listing 2 below presents a stack custom resource named "test" which is based upon (or in other words, subscribes to) the "unstable" channel:

Listing 1

```
1 apiVersion:  tmc.eng.vmware.com/v1alpha1
2 kind:  Channel
3 metadata:
4   name:  unstable
5 spec:
6   components:
7   - name:  ui
8       sourceImage:  vmware-docker.bintray.io/ui/config
9       revision:  61c4a6ac83da7435dba34855b9cc48be96e7c981
10      ingress:
11      - backend:
12          serviceName:  server
13          servicePort:  80
14          path:  /
```

Listing 2

```
1 apiVersion:  tmc.eng.vmware.com/v1alpha1
2 kind:  Stack
3 metadata:
4   name:  test
5 spec:
6   channel:  unstable
7   config:
8       UI_CLIENT_ID:  test-client
```

Turning now to workflow 400, at block 402 a stack custom resource for stack S can be received and applied to the cell on which S is to be deployed. As noted above, this stack custom resource can subscribe to a channel which defines the component image versions for the stack and where those component images can be downloaded from.

At blocks 404, 406, and 408, stack lifecycle controller 118 of the cell can detect that the stack custom resource has been applied, retrieve (from, e.g., a local Kubernetes data store) the channel custom resource specified in the stack custom resource, and download the component images specified in the channel custom resource from the appropriate image registry. Stack lifecycle controller 118 can then deploy the downloaded component images, thereby deploying stack S on the cell (block 410).

Finally, stack lifecycle controller 118 can update the stack custom resource with the status of the deployed stack (block 412). This status information can include the network endpoint address through which the stack may be accessed, the deployed region, and the Kubernetes namespace of the stack. For example, Listing 3 below illustrates an updated version of the "test" stack custom resource of Listing 2 after it has been deployed on a cell:

---
Listing 3
---
```
1 apiVersion:  tmc.eng.vmware.com/v1alpha1
2 kind:   Stack
3 metadata:
4   name:   test
5 spec:
6   channel:   unstable
7   config:
8     UI_CLIENT_ID:   test-client
9 status:
10    endpoint:
11      url:   https://test.tmc.vmware.com
12    namespace:   tmc-test
13    region:   us-west-2
```
---

Although not shown in FIG. 4, once stack S has been deployed and the status section of its custom resource has been updated, stack publisher 120 within the cell can transmit metadata regarding the deployed stack (e.g., stack name, network endpoint address, namespace, region, etc.) to global tenancy service 114 for storage in global tenancy database 116. This enables SaaS infrastructure 100 to maintain a top-level view of all of the stacks within the infrastructure.

5. Customer Traffic Routing

Figure 5:
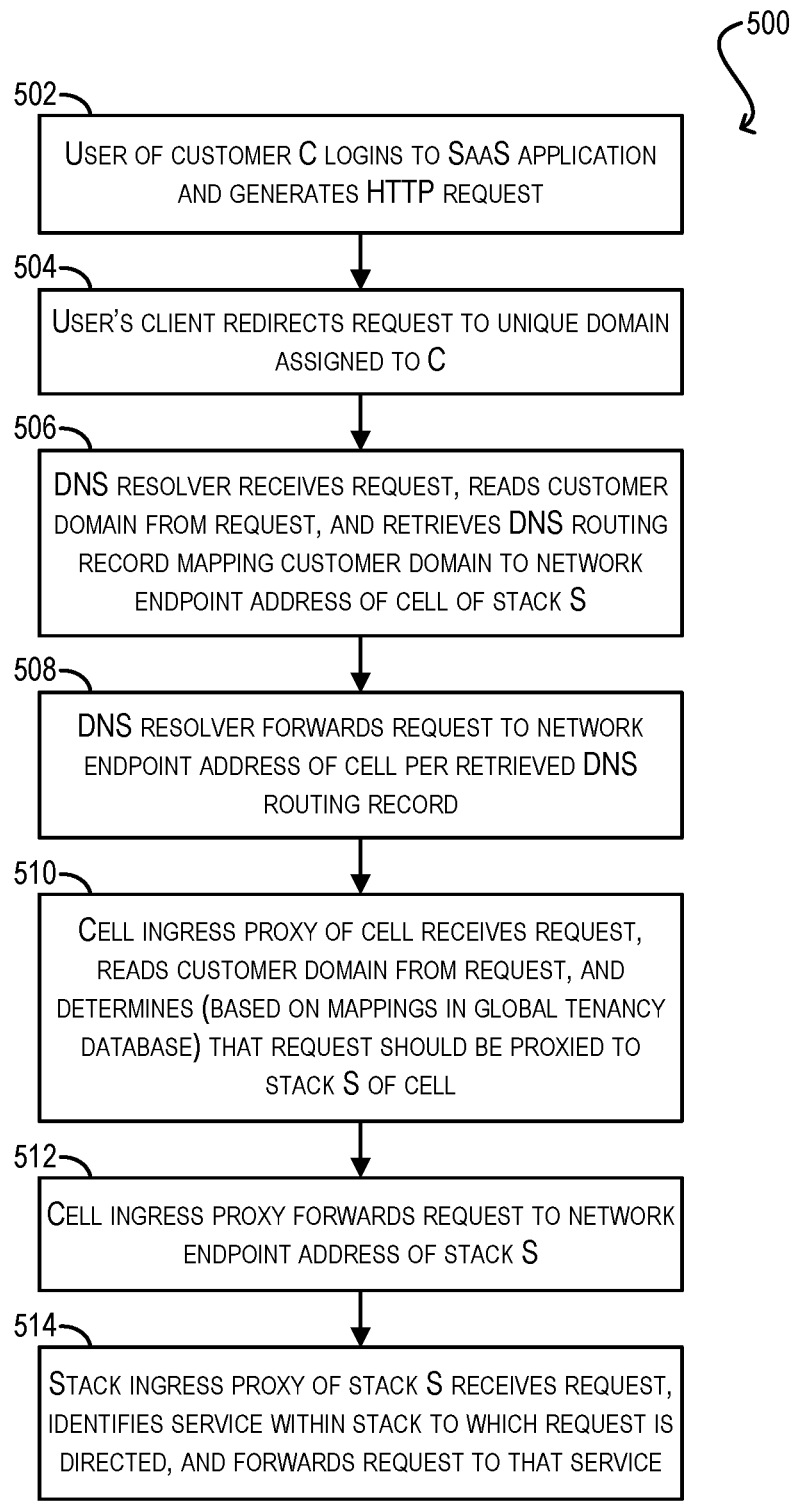
FIG. 5 depicts a customer traffic routing workflow according to certain embodiments.

FIG. 5 depicts a workflow 500 that can be carried out by DNS resolver 126 and various components of SaaS infrastructure 100 for routing application traffic for a customer C of SaaS application 110 to the customer's assigned stack S according to certain embodiments. Workflow 500 assumes that customer C has been onboarded per workflow 300 of FIG. 3.

Starting with block 502, a user of customer C can login to SaaS application 110 via a web browser or other web-based client and can generate an HTTP request for accessing some functionality of the application. For example, the HTTP request may be a request to load a particular page/UI of SaaS application 110 or a request to execute a particular application operation or API.

At block 504, the user's client can automatically redirect the HTTP request to the unique domain name assigned to the customer via the onboarding workflow (e.g., "customer-C.appname.com"). In one set of embodiments, this redirection may be performed via an OAuth-based redirect mechanism that is established on the user's client at the time of login.

At block 506, DNS resolver 126 can receive the HTTP request, read the domain name of customer C specified in the request, and retrieve the DNS routing record created for that domain name per block 316 of workflow 300 (i.e., the record that maps customer C's domain name to the network endpoint address of the cell on which stack S is hosted). DNS resolver 126 can then forward the HTTP request to that cell, per the retrieved record (block 508).

At block 510, the cell's ingress proxy 122 can receive the forwarded request, read the domain name of customer C specified in the request, and determine, based the on the customer-to-domain and customer-to-stack mappings maintained in global tenancy database 116, that the request should be proxied to stack S of the cell. Cell ingress proxy 122 can then forward the HTTP request to the network endpoint address of that stack (block 512).

Finally, at block 514, stack ingress proxy 124 of stack S can receive the forwarded request, identify a particular service 106 within stack S to which the request is directed (based on, e.g., a service path specified in the request), and forward the request to that service 106 for processing.

With the routing approach shown in FIG. 5, a number of advantages are achieved. First, because each customer is assigned its own domain name and these domain names are tied to the customers' corresponding cells via the DNS routing records maintained by DNS resolver 126, this approach ensures that customer requests are routed directly to the appropriate cell, rather than being proxied across cells. This is particularly useful in scenarios where the cells of SaaS infrastructure 100 are located in different geographic regions and the cells are hosted by a platform service provider that imposes a significant cost for routing traffic across regions.

Second, because all of the request routing is based on the domain name and path specified in each customer request, there is no need for the routing components of SaaS infrastructure 100 to inspect the actual content/payload of the request traffic. This reduces the overall latency of the routing workflow and enables the request traffic to be encrypted in an end-to-end manner from the web browser of the originating customer/user to the target service within a stack.

It should be noted that, in some scenarios, a stack that has failed in a first cell X of SaaS infrastructure 100 may be automatically replicated to a second cell Y to ensure continuity of operation for the stack's tenants. In these scenarios, cell ingress proxy 122 of cell X will continue receiving application traffic originating from the customers of the failed stack until the DNS routing records of DNS resolver 126 are updated to route those customers' domain names to cell Y. Accordingly, upon receiving such traffic, cell ingress proxy 122 of cell X can forward that traffic to the cell ingress proxy of cell Y for delivery to the replicated stack, and this can continue until DNS resolver 126 is updated to point to cell Y for the stack's customer domains.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   receiving, by a global onboarding service for a software-as-a-service (SaaS) infrastructure, a request for onboarding a new customer to an application hosted on the SaaS infrastructure, wherein the SaaS infrastructure comprises a plurality of computing clusters, wherein each computing cluster includes a plurality of physical or virtual machines that concurrently support single-tenant and multi-tenant runtime instances of the application, and wherein the global onboarding service is separate from the plurality of computing clusters;
   assigning, by the global onboarding service, a customer identifier and a unique domain name to the new customer;
   determining, by the global onboarding service based on one or more criteria pertaining to a current configuration of the SaaS infrastructure, whether the new customer can be hosted on an existing runtime instance of the application in the SaaS infrastructure;
   upon determining that the new customer can be hosted on an existing runtime instance, transmitting, by the global onboarding service, the customer identifier, the unique domain name, and an identifier of the existing runtime instance to a global tenancy service of the SaaS infrastructure; and
   upon determining that the new customer cannot be hosted on an existing runtime instance;
      identifying, by the global onboarding service, a computing cluster in the plurality of computing clusters where a new runtime instance of the application should be created for the new customer; and
      transmitting, by the global onboarding service, a desired state of the new runtime instance to a lifecycle controller in the identified computing cluster, the desired state including a reference to a resource definition that defines a type of the new runtime instance, an image registry path for component images for the new runtime instance, and versions of the component images,
   wherein upon receiving the desired state, the lifecycle controller is configured to create the new runtime instance in the identified computer cluster in accordance with the desired state and transmit a name, a network endpoint address, and a namespace of the new runtime instance to the global tenancy service.

2. The method of claim 1 wherein the one or more criteria include a number of existing customers currently hosted on each runtime instance of the application in the SaaS infrastructure.

3. The method of claim 1 wherein the determining is further based on one or more customer preferences or requirements included in the request.

4. The method of claim 3 wherein the one or more customer preferences or requirements includes a preference or requirement that application data of the new customer be isolated from other customers of the application.

5. The method of claim 3 wherein the one or more customer preferences or requirements includes a preference or requirement that the new customer be assigned to a runtime instance in a geographic region where a majority of users of the new customer reside.

6. The method of claim 1 further comprising:
   generating a Domain Name System (DNS) routing record that maps the unique domain name to a network endpoint address of a computing cluster running the existing runtime instance; and transmitting the DNS routing record to a DNS resolver communicatively coupled with the SaaS infrastructure.

7. A non-transitory computer readable storage medium having stored thereon program code executable by a global onboarding service of a software-as-a-service (SaaS) infrastructure, the program code embodying a method comprising:

receiving a request for onboarding a new customer to an application hosted on the SaaS infrastructure, wherein the SaaS infrastructure comprises a plurality of computing clusters, wherein each computing cluster includes a plurality of physical or virtual machines that concurrently support single-tenant and multi-tenant runtime instances of the application, and wherein the global onboarding service is separate from the plurality of computing clusters;

assigning a customer identifier and a unique domain name to the new customer;

determining, based on one or more criteria pertaining to a current configuration of the SaaS infrastructure, whether the new customer can be hosted on an existing runtime instance of the application in the SaaS infrastructure;

upon determining that the new customer can be hosted on an existing runtime instance, transmitting the customer identifier, the unique domain name, and an identifier of the existing runtime instance to a global tenancy service of the SaaS infrastructure; and upon determining that the new customer cannot be hosted on an existing runtime instance:

identifying a computing cluster in the plurality of computing clusters where a new runtime instance of the application should be created for the new customer; and transmitting a desired state of the new runtime instance to a lifecycle controller in the identified computing cluster, the desired state including a reference to a resource definition that defines a type of the new runtime instance, an image registry path for component images for the new runtime instance, and versions of the component images, wherein upon receiving, the desired state, the lifecycle controller is configured to create the new runtime instance in the identified computer cluster in accordance with the desired state and transmit a name, a network endpoint address, and a namespace of the new runtime instance to the global tenancy service.

8. The non-transitory computer readable storage medium of claim 7 wherein the one or more criteria include a number of existing customers currently hosted on each runtime instance of the application in the SaaS infrastructure.

9. The non-transitory computer readable storage medium of claim 7 wherein the determining is further based on one or more customer preferences or requirements included in the request.

10. The non-transitory computer readable storage medium of claim 9 wherein the one or more customer preferences or requirements includes a preference or requirement that application data of the new customer be isolated from other customers of the application.

11. The non-transitory computer readable storage medium of claim 9 wherein the one or more customer preferences or requirements includes a preference or requirement that the new customer be assigned to a runtime instance in a geographic region where a majority of users of the new customer reside.

12. The non-transitory computer readable storage medium of claim 7 wherein the method further comprises:

generating a Domain Name System (DNS) routing record that maps the unique domain name to a network endpoint address of a computing cluster running the existing runtime instance; and transmitting the DNS routing record to a DNS resolver communicatively coupled with the SaaS infrastructure.

13. A computer system running a global onboarding service of a software-as-a-service (SaaS) infrastructure, the computer system comprising:

a processor; and a non-transitory computer readable medium having stored thereon program code that, when executed by the processor, causes the processor to:

receive a request for onboarding a new customer to an application hosted on the SaaS infrastructure, wherein the SaaS infrastructure comprises a plurality of computing clusters, wherein each computing cluster includes a plurality of physical or virtual machines that concurrently support single-tenant and multi-tenant runtime instances of the application, and wherein the global onboarding service is separate from the plurality of computing clusters;

determine, based on one or more criteria pertaining to a current configuration of the SaaS infrastructure, whether the new customer can be hosted on an existing runtime instance of the application in the SaaS infrastructure;

upon determining that the new customer can be hosted on an existing runtime instance, transmit the customer identifier, the unique domain name, and an identifier of the existing runtime instance to a global tenancy service of the SaaS infrastructure; and upon determining that the new customer cannot be hosted on an existing runtime instance:

identify a computing cluster in the plurality of computing clusters where a new runtime instance of the application should be created for the new customer; and transmit a desired state of the new runtime instance to a lifecycle controller in the identified computing cluster, the desired state including a reference to a resource definition that defines a type of the new runtime instance, an image registry path for component images for the new runtime instance, and versions of the component images, wherein upon receiving, the desired state, the lifecycle controller is configured to create the new runtime instance in the identified computer cluster in accordance with the desired state and transmit a name, a network endpoint address, and a namespace of the new runtime instance to the global tenancy service.

14. The computer system of claim 13 wherein the one or more criteria include a number of existing customers currently hosted on each runtime instance of the application in the SaaS infrastructure.

15. The computer system of claim 13 wherein the determining is further based on one or more customer preferences or requirements included in the request.

16. The computer system of claim 15 wherein the one or more customer preferences or requirements includes a preference or requirement that application data of the new customer be isolated from other customers of the application.

17. The computer system of claim 15 wherein the one or more customer preferences or requirements includes a preference or requirement that the new customer be assigned to a runtime instance in a geographic region where a majority of users of the new customer reside.

18. The computer system of claim 13 wherein the processor is further configured to:
   generate a Domain Name System (DNS) routing record that maps the unique domain name to a network endpoint address of a computing cluster running the existing runtime instance; and
   transmit the DNS routing record to a DNS resolver communicatively coupled with the SaaS infrastructure.

* * * * *